(12) United States Patent
Tsai

(10) Patent No.: US 7,443,617 B2
(45) Date of Patent: Oct. 28, 2008

(54) ASSEMBLING AND TESTING DEVICE FOR LENS UNITS AND METHOD FOR EMPLOYING THE SAME

(75) Inventor: Kun-Jung Tsai, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 335 days.

(21) Appl. No.: 11/453,645

(22) Filed: Jun. 14, 2006

(65) Prior Publication Data
US 2007/0091298 A1    Apr. 26, 2007

(51) Int. Cl.
G02B 7/02    (2006.01)

(52) U.S. Cl. .................. 359/811; 359/813; 359/819
(58) Field of Classification Search ................. 359/811, 359/813, 819, 821, 827
See application file for complete search history.

Primary Examiner—Timothy J Thompson

(57) ABSTRACT

An apparatus (100) for assembling and testing a lens unit (20) having a barrel (202) and a lens group (204) includes an assembling device (22), a testing device and a mounting member (30). The assembling device is used to assemble the lens group into the barrel to form the lens unit. The testing device is used to test the assembled lens unit. The mounting member is configured for carrying the lens unit in a manner so as to move the lens unit along a circle from a first position where the assembling device performs the assembling to a second position where the testing device performs the testing.

18 Claims, 1 Drawing Sheet

ASSEMBLING AND TESTING DEVICE FOR LENS UNITS AND METHOD FOR EMPLOYING THE SAME

TECHNICAL FIELD

The present invention generally relates to assembling and testing devices and methods for employing the same and, more particularly, to an assembling and testing device for assembling and testing lens units and a method of assembling and testing lens units.

BACKGROUND

With the rapid development of multimedia technology, use of digital devices such as digital still cameras ("still cameras") and digital video cameras ("video cameras") has become wide-spread in many countries. Furthermore, more and more mobile phones and PDAs (personal digital assistants) are combined with digital lens units. Therefore, lens units are in great demand. Nowadays, lens units are still very expensive due to the high rejection during quality control.

Generally, when assembling lenses, lens pieces, spacers, aperture pieces and other elements are pressed into a barrel so as to form a lens unit. Then modulation transfer function (MTF) testing is applied to test clarity and contrast of the lens unit. Before pressing the lens pieces, spacers, aperture pieces and other elements into the barrel, pressing parameters such as pressure and pressing velocity are predetermined so as to obtain flawless lens units. However, if the pressing parameters are changed during assembly, many flawed lens units may be produced before the change in pressing parameters is discovered.

What is needed, therefore, is an assembling and testing device, which overcomes the above-described problems.

SUMMARY

In one aspect thereof, an apparatus for assembling and testing a lens unit having a barrel and a lens group includes an assembling device, a testing device and a mounting member. The assembling device is used to assemble the lens group into the barrel to form the lens unit. The testing device is used to test the assembled lens unit. The mounting member is configured for carrying the lens unit in a manner so as to move the lens unit along a circle from a first position where the assembling device performs the assembling to a second position where the testing device performs the testing.

In another aspect thereof, a method of assembling and testing lens units having a barrel and a lens group comprising the following steps: mounting a first barrel on a mounting member; rotating the mounting member; pressing a first lens group into the first barrel to form a first lens unit and mounting a second barrel on the mounting member at substantially the same time; testing the first lens unit using a testing device, pressing a second lens group into the second barrel to form a second lens unit, and mounting a third barrel on the mounting member at substantially the same time.

Other advantages and novel features of preferred embodiments of the present invention will become more apparent from the following detailed description thereof when taken in conjunction with the accompanying drawing:

BRIEF DESCRIPTION OF THE DRAWING

Many aspects of the assembling and testing devices can be better understood with reference to the following drawing. The components in the drawing are not necessarily drawn to scale, the emphasis instead being placed upon clearly illustrating the principles of the assembling and testing devices. Moreover, in the drawing, like reference numerals designate corresponding parts throughout the view.

DETAILED DESCRIPTION OF THE EMBODIMENTS

Figure 1:
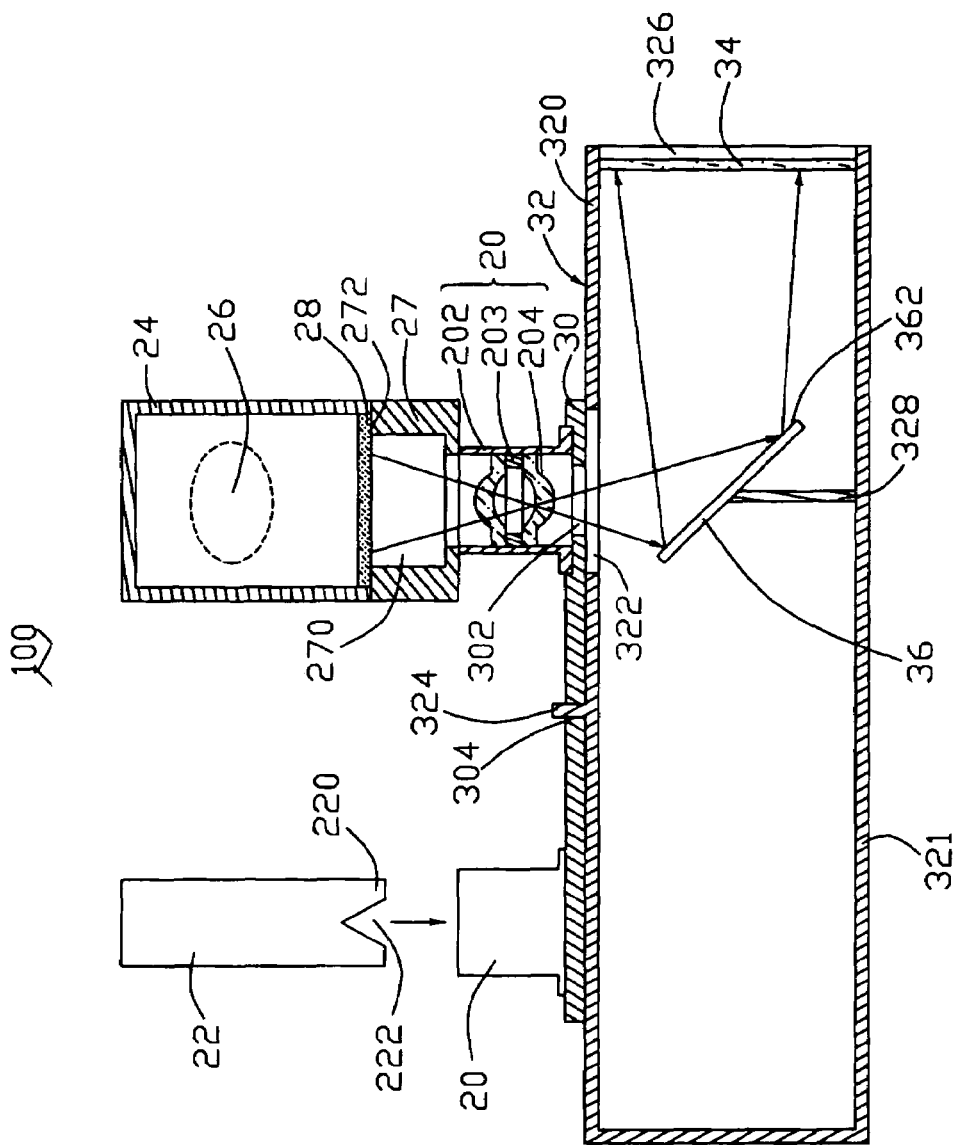
FIG. 1 is a schematic, cross-sectional view in accordance with an embodiment of an assembling and testing device for lenses.

An assembling and testing device is provided for assembling a lens unit and testing MTF of the lens unit.

Referring to FIG. 1, an embodiment of an assembling and testing device 100 for assembling and testing a lens unit 20 includes a pressing device 22, a testing device (not labeled) and a mounting device 30. The testing device includes a lampshade 24, a light source 26, a connecting member 27, a MTF plate 28, a supporting member 32, a screen 34 and a reflective element 36.

The lens unit 20 includes a barrel 202, at least one spacer 203 and a lens group 204 mounted in the barrel 202. The barrel 204 is a hollow cylinder. The lens group 202 includes at least one lens mounted in the barrel 204. The at least one spacer 203 are mounted between any two adjacent lenses. In this embodiment, two lenses and one spacer 203 are provided. The lens has an optical portion in the middle and a non-optical portion at a periphery of the optical portion. The spacer 203 is mounted between the two lenses. The lens and the spacer 203 are pressed into the barrel 202 to form the lens unit 20.

The pressing device 22 has a pressing end 220 defining a V-shaped cutout 222 to prevent the pressing end 220 from touching the optical portion of the lenses. The lampshade 24 is a hollow cylinder having a closed end and an open end. The light source 26 is located in the lampshade 24.

The connecting member 27 is a hollow cylinder having a hole 270 running through two ends thereof for allowing propagation of light therethrough. The connecting member 27 has a top surface 272. The lampshade 24 is disposed on the connecting member 27. The open end of the lampshade 24 faces the connecting member 27.

The MTF plate 28 is a patterned plate having a black-and-white striped pattern thereon. The MTF plate 28 is disposed on the top surface 272 of the connecting member 27 and between the connecting member 27 and the light source 26. The mounting member 30 is a dish-shaped plate. Three light holes 302 are defined in the mounting member 30 in a pattern of an equilateral triangle wherein each light hole 302 defines a light path therethrough. That is, an angle defined by a hypothetical line connecting a center of the mounting member 30 and a center of one light hole 302 and a hypothetical line connecting the center of the mounting member 30 and a center of an adjacent light hole 302 is 120 degrees. A mounting hole 304 is defined in the center of the mounting member 30. The pressing device 22 is positioned corresponding to a light path of one of the light holes 302, and the connecting member 27 and the lampshade 24 are positioned corresponding to a light path of another one of the light holes 302. That is, the pressing device 22 is set above one light hole 302. The connecting member 27 and the lampshade 24 are set above another light hole 302 and have a central axis identical to that of the light hole 302. During operation of the assembling and testing device 100, the lens unit 20 is firmly mounted on the mounting member 30, with the lens unit 20 positioned corresponding to the light path of one of the light holes 302.

The supporting member 32 is a hollow cuboid including a top board 320, a bottom board 321 opposite to the top board 320 and an open side 326 adjacent to the top board 320 and the bottom board 321. The top board 320 defines an opening 322 and forms a pole 324 engaged in the mounting hole 304 of the mounting member 30 allowing the mounting member 30 to rotate relative to the supporting member 32. A distance between a center of the opening 322 and an axis of the pole 324 is equal to that between a center of each light hole 302 and a center of the mounting hole 304. A mounting post 328 is formed in the supporting member 32 corresponding to the position of the opening 322.

The screen 34 is disposed at the open side 326 of the supporting member 32. The reflective element 36 having a reflective surface 362 is fixed at an end of the mounting post 328. The reflective surface 362 faces the opening 322 and the screen 34. The reflective surface 362 is slanted at an angle of 45 degrees with respect of the screen 34.

When the assembling and testing device 100 works, firstly, one barrel 202 is fixedly mounted on the mounting member 30. An axis of the barrel 202 is shares the same axis as one of the light holes 302. Secondly, the mounting member 30 is automatically or manually rotated through an angle of 120 degrees so that the barrel 202 is under the pressing device 22. The pressing device 22 presses the lens group 204 and the spacer 203 into the barrel 202 to form a lens unit 20. Thirdly, the mounting member 30 is further rotated through an angle of 120 degrees so that the lens unit 20 corresponds to the light source 26 and the MTF plate 28. Light from the light source 26 passes through the MTF plate 28 and the lens unit 20, and is reflected by the reflective element 36 to radiate onto the screen 34. The MTF of the lens unit 20 can be measured because the images on the screen 34 can show whether the lens unit 20 is flawed or not. Thereby, the MTF of the lens unit 20 is tested immediately after the lens unit 20 being produced. Therefore, we can know immediately whether the pressing parameters of the pressing device 22 are suitable or not, and the production of a mass of ineligible lens units 20 can be avoided. The three processes may be carried out at the same time to assemble and test three lens units 20 simultaneously. That is, pressing a second lens group into a second barrel by the pressing device and testing a third lens unit by the testing device whilst a first barrel is mounted on the mounting member. Thus, an efficiency is highly improved.

In alternative embodiments, the number of light hole 302 may be any such as one, two or four. The lampshade 24 and the connecting member 27 may be omitted.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An assembling and testing device for assembling and testing lens units having a barrel and a lens group, the assembling and testing device comprising:
   a pressing device for pressing the lens group into the barrel to form the lens unit;
   a testing device for testing the lens units; and
   a mounting member for fixedly mounting the barrel of the lens unit, the mounting member being rotatable relative to the pressing device and the testing device thus allowing the barrel of the lens unit to be selectively positioned corresponding to the pressing device or the testing device.

2. The assembling and testing device as claimed in claim 1, wherein the pressing device comprises a pressing end defining a V-shaped cutout.

3. The assembling and testing device as claimed in claim 1, wherein the testing device comprises a light source, a patterned plate, a screen, and a reflective element having a reflective surface, the patterned plate is disposed between the light source and the reflective element, the lens unit is disposed between the patterned plate and the reflective element.

4. The assembling and testing device as claimed in claim 3, wherein the reflective surface of the reflective element faces the lens unit and the screen, the reflective element is slanted at an angle of 45 degrees with respect to the screen.

5. The assembling and testing device as claimed in claim 3, wherein the patterned plate is a modulation transfer function plate having a black-and-white striped pattern thereon.

6. The assembling and testing device as claimed in claim 4, wherein the testing device further comprises a lampshade, a connecting member connecting the lampshade and the lens unit, and a supporting member, the light source is disposed in the lampshade, the lampshade has an open end for allowing light from the light source to propagate therethrough, and the patterned plate is disposed on the connecting member.

7. The assembling and testing device as claimed in claim 6, wherein the mounting member is a dish-shaped plate, the mounting member defines three light holes distributed in a pattern of an equilateral triangle, each light hole defines a light path therethrough.

8. The assembling and testing device as claimed in claim 7, wherein the pressing device is positioned corresponding to a light path of one of the light holes, and the connecting member and the lampshade are positioned corresponding to a light path of another one of the light holes, the lens unit is firmly mounted on the mounting member, with the lens unit positioned corresponding to the light path of one of the light holes.

9. The assembling and testing device as claimed in claim 8, wherein the supporting member is a hollow cuboid including a top board, a bottom board opposite to the top board and an open side adjacent to the top board and the bottom board, the mounting member defines a mounting hole in the center thereof, the top board defines an opening and forms a pole engaged in the mounting hole of the mounting member.

10. The assembling and testing device as claimed in claim 9, wherein the reflective element is disposed in the supporting member, the screen is disposed at the open side of the supporting member.

11. A method of assembling and testing lens units having a barrel and a lens group, the method comprising the following steps:
   mounting a first barrel on a mounting member;
   rotating the mounting member;
   pressing a first lens group into the first barrel to form a first lens unit and mounting a second barrel on the mounting member at substantially the same time;
   rotating the mounting member; and
   testing the first lens unit using a testing device, pressing a second lens group into the second barrel to form a second lens unit, and mounting a third barrel on the mounting member at substantially the same time.

12. The method as claimed in claim 11, wherein the testing device comprises a light source, a patterned plate, a screen, and a reflective element having a reflective surface, light from the light source passes through the patterned plate and the lens unit, and is reflected by the reflective element to radiate onto the screen.

13. An apparatus for assembling and testing a lens unit having a barrel and a lens group, the apparatus comprising:

an assembling device for assembling the lens group into the barrel to form the lens unit;

a testing device for testing the assembled lens unit; and a mounting member configured for carrying the lens unit in a manner so as to move the lens unit along a circle from a first position where the assembling device performs the assembling to a second position where the testing device performs the testing.

14. The apparatus of claim 13, wherein the assembling device includes a pressing member for pressing the lens group into the barrel.

15. The apparatus of claim 13, wherein the testing device is a device for testing a modulation transfer function of the lens unit.

16. The apparatus of claim 13, wherein the mounting member defines a plurality of lens unit carry positions for carrying a plurality of lens units.

17. The apparatus of claim 16, wherein the carry positions are equidistantly arranged along the circle.

18. The apparatus of claim 17, wherein the number of the carry positions is three.

* * * * *